United States Patent [19]
Jones

[11] Patent Number: 5,541,573
[45] Date of Patent: Jul. 30, 1996

[54] METHOD OF DETECTING A DEFLATED TIRE ON A VEHICLE

[75] Inventor: David Jones, Lichfield, England

[73] Assignee: Sumitomo Rubber Industries Limited, Hyogo-ken, Japan

[21] Appl. No.: 316,487

[22] Filed: Oct. 3, 1994

[30] Foreign Application Priority Data

Oct. 9, 1993 [GB] United Kingdom ............... 9320843

[51] Int. Cl.$^6$ ............................................. B60C 23/00
[52] U.S. Cl. ......................... 340/444; 73/146.5; 340/442
[58] Field of Search .................................... 340/442, 444, 340/671, 443; 73/146.5, 146.2

[56] References Cited

U.S. PATENT DOCUMENTS

| | | | |
|---|---|---|---|
| 4,876,528 | 10/1989 | Walker et al. ............... | 340/442 |
| 5,192,929 | 3/1993 | Walker et al. ............... | 340/442 |
| 5,218,862 | 6/1993 | Hurrell, II et al. .......... | 340/444 |
| 5,239,469 | 8/1993 | Walker et al. ............... | 340/444 |
| 5,248,957 | 9/1993 | Walker et al. ............... | 364/565 |
| 5,252,946 | 10/1993 | Walker et al. ............... | 340/444 |
| 5,345,217 | 9/1994 | Prottey ......................... | 340/442 |

FOREIGN PATENT DOCUMENTS

| | | |
|---|---|---|
| 0552827 | 7/1993 | European Pat. Off. . |
| 0564285 | 10/1993 | European Pat. Off. . |
| 0607695 | 7/1994 | European Pat. Off. . |

*Primary Examiner*—Brent A. Swarthout
*Attorney, Agent, or Firm*—Birch, Stewart, Kolasch & Birch, LLP

[57] ABSTRACT

A method of detecting a deflated tire on a vehicle by comparing the rolling radii of the tires by comparing angular velocity speed signals C1, C2, C3, and C4 from wheel speed sensors, one on each wheel, comprising the steps of: calculating in normal driving an error value DEL' by processing the four angular velocity speed signals C1–C4 and expressing the result as a percentage of the mean of the sums, DEL'=(C1+C4–C2–C3)×50/((C1+C2+C3+C4)/4); sensing when the magnitude of the error value DEL' is in the range 0.05 to 0.5 and when it is carrying out the step of deciding which tire is apparently deflated by comparison of the angular velocity speed signals C1–C4 with each other, calculating a wheel error value DEL'FAC(W) for each wheel W produced with the deflated tire by the method for DEL' in normal driving, where DEL'FAC=(C1+C4–C2–C3)×50/((C1+C2+C3=C4)/4) and calculating the wheel factor FAC(W) for each wheel W by dividing the wheel error values DEL'FAC(W) for the wheels by the wheel error value DEL'FAC of one of the wheels, and calculating a standardized corrected error value STDDEL by dividing the error value DEL' by the wheel factor FAC(W) for the wheel having the tire which is apparently deflated and if the value of the standardized corrected error value STDDEL is in the range 0.05 to 0.5 operating a tire warning indicator to indicate that that particular tire is deflated.

38 Claims, 4 Drawing Sheets

METHOD OF DETECTING A DEFLATED TIRE ON A VEHICLE

This invention relates to a method of detecting a deflated tire on a vehicle suitable for cars, trucks or the like.

BACKGROUND OF THE INVENTION

Prior applications such as French Patent Publication No 2568519 and European Patent Publication No 291 217 propose using wheel speed signals from the vehicle wheels such as for example the signals from an anti-lock braking system which are multi-pulse signals of typically 48 to 96 pulses per revolution of each wheel. The prior art system compares the speed derived signals in various ways, and also attempts to overcome errors due to vehicle factors such as cornering, braking, accelerating, uneven or changing loads, which can cause changes in the speed signals which are larger than those caused by a tire deflation of for example 0.4 bar.

French Patent Publication 2568519 avoided errors of this type by monitoring the speeds of the diagonally opposed pairs of wheels for a long time or distance period so that it averaged out effectively cornering of the vehicle. The result however was that the device operated very slowly taking many Kilometres to sense a pressure loss.

European Patent Publication No 291 217 improved the situation by calculating the lateral and longitudinal acceleration of the vehicle using the same four wheel speed signals and setting fixed limits above which the detection system was inhibited to avoid false signals due to cornering and acceleration. This inhibition of detection however meant that for a proportion of the time of vehicle running the system was not sensing punctures, the actual proportion depending upon the type of roads and the way the vehicle was being driven.

The real difficulty with these types of systems is that, apart from the lateral acceleration of the vehicle which occurs during cornering causing increased deflection of the outer pair of wheels compared to the inner pair of wheels, each vehicle has different characteristics due to the position of the center of gravity and the type of suspension and these different characteristics when cornering produce additional deflections in the outer pairs of tires with regard to the inner pairs of tires.

However the vehicle characteristics make the tire deflections different in each of the tires. Similar problems occur due to vehicle characteristics in the deflections in the front pair of tires compared to the rear pair when the vehicle brakes, and vice-versa when the vehicle accelerates.

SUMMARY OF THE INVENTION

It is an object of the present invention to provide a method of detecting a deflated tire on a vehicle which accommodates the above changes, avoiding false signals and detecting deflation for substantially all the time when the vehicle is running.

According to one aspect of the present invention there is provided a method of detecting a deflated tire on a vehicle by comparing the rolling radii of the tires by means of comparing angular velocity speed signals C1, C2, C3 and C4 from wheel speed sensors on wheels 1–4 at the left-hand front, right-hand front, left-hand rear and right-hand rear wheel positions respectively, comprising the steps of calculating an error value DEL' in normal driving by processing the four angular velocity speed signals C1–C4 in a central process unit (10) which subtracts the sum of the signals from one pair of diagonally opposite wheels from the sum of the signals from the other pair of diagonally opposite wheels and expressing the result as a percentage of the mean of the sums $$DEL'=(C1+C4-C2-C3)\times 50/((C1+C2+C3+C4)/4),$$

sensing when the magnitude of the error value DEL' is in the range 0.05 to 0.5 and when it is carrying out the step of deciding which tire is apparently deflated by comparison of the angular velocity speed signals C1–C4 with each other, characterized by a calibration step of determining for each wheel of the vehicle a wheel factor FAC(W) W=1,2,3,4 by a setup procedure comprising driving the vehicle in a straight line at constant speed and reducing in turn the pressure in each tire by 0.6 bar while maintaining the other tires at their scheduled pressure, calculating a wheel error value DEL'FAC(W) for each wheel W produced with the deflated tire by the method for DEL' in normal driving, i.e. where $$DEL'FAC=(C1+C4-C2-C3)\times 50/((C1+C2+C3+C4)/4)$$

and calculating the wheel factor FAC(W) for each wheel W by dividing the wheel error values DEL'FAC(W) for the wheels by the wheel error value DEL'FAC of one of the wheels, where $$FAC(W)=DEL'FAC(W)/DEL'FAC(1), \text{ or}$$

$$FAC(W)=DEL'FAC(W)/DEL'FAC(2), \text{ or}$$

$$FAC(W)=DEL'FAC(W)/DEL'FAC(3), \text{ or}$$

$$FAC(W)=DEL'FAC(W)/DEL'FAC(4)$$

so that the four wheel factors are related to each other and in normal operation of the vehicle a step of calculating a standardized corrected error value STDDEL by dividing the error value DEL' by the wheel factor FAC(W) for the wheel having the tire which is apparently deflated and if the value of the standardized corrected error value STDDEL is in the range 0.05 to 0.5 operating a tire warning indicator provided in the vehicle finally to indicate that that particular tire on the wheel on the vehicle is deflated.

Preferably a method of detecting a deflated tire on a vehicle by comparing the rolling radii of the tires by means of comparing angular velocity speed signals C1, C2, C3 and C4 from wheel speed sensors on wheels 1–4 at the left-hand front, right-hand front, left-hand rear and right-hand rear wheel positions respectively, comprises the steps of firstly determining a vehicle related constant VFAC by a setup procedure wherein the vehicle is steered around a circle with its four tires inflated to their normal scheduled pressure at a plurality of n constant speeds, calculating for each set of values (SVn) of C1–C4 a setup lateral acceleration value (SETUPACCLATn) wherein $$SETUPACCLAT=(C1+C3-C2-C4)\times(C1+C2+C3+C4)/(4\times KPHFAC\times KPHFAC)$$

where KPHFAC is the number of wheel speed signals per wheel speed sensor per unit of speed, calculating for each set of values SVn of C1–C4 a vehicle setup error value SET- UPDELn where $$SETUPDEL = (C1+C4-C2-C3) \times 50/((C1+C2+C3+C4)/4)$$

and setting the vehicle related VFAC equal to the relationship between the vehicle setup error value SETUPDEL and the setup lateral acceleration value SETUPACCLAT, and secondly determining for each wheel of the vehicle a wheel factor FAC(W) W=1,2,3,4 by driving the vehicle in a straight line at constant speed and reducing in turn the pressure in each tire by 0.6 bar while maintaining the other tires at their scheduled pressure, calculating a wheel error value DEL'FAC(W) for each wheel W produced by deflating the tire where $$DEL'FAC = (C1+C4-C2-C3) \times 50/((C1+C2+C3+C4)/4)$$

and calculating a wheel factor FAC(W) for each wheel W by dividing the wheel error values DEL'FAC(W) for the wheels by the wheel error value DEL'FAC of one of the wheels, where $$FAC(W) = DEL'FAC(W)/DEL'FAC(1), \text{ or}$$

$$FAC(W) = DEL'FAC(W)/DEL'FAC(2), \text{ or}$$

$$FAC(W) = DEL'FAC(W)/DEL'FAC(3), \text{ or}$$

$$FAC(W) = DEL'FAC(W)/DEL'FAC(4)$$

so that the four wheel factors are related to each other and then thirdly in normal driving calculating an error value DEL' where $$DEL' = (C1+C4-C2-C3) \times 50/((C1+C2+C3+C4)/4)$$

determining a correction factor LAT, wherein the correction factor (LAT) is selected by calculating from the four angular velocity values C1, C2, C3 and C4 respective first, second, third and fourth deciding factors (MC1, MC2, MC3, MC4) where $$MC1 = C1$$

$$MC2 = C2/[(C2+C4)/(C1+C3)]$$

$$MC3 = C3/[(C3+C4)/(C1+C2)]$$

$$MC4 = C4/[[(C2+C4)/(C1+C3)] \times [(C3+C4)/(C1+C2)]],$$

then summing the four deciding factors and multiplying this sum by a centralizing constant (K) to give a central deciding factor (MPSD) and selecting the correction factor (LAT) as follows, if the first or second deciding factor (MC1 or MC2) is greater than the central deciding factor (MPSD) then $$LAT = 2 \times (C3-C4) \times (C1+C2+C3+C4)/4,$$

if the third or fourth deciding factor (MC3 or MC4) is greater than the central deciding factor (MPSD) then $$LAT = 2 \times (C1-C2) \times (C1+C2+C3+C4)/4,$$

or if none of the deciding factors (MC1, MC2, MC3 or MC4) is greater than the central deciding factor (MPSD) then $$LAT = (C1+C3-C2-C4) \times (C1+C2+C3+C4)/4,$$

calculating a corrected error value DEL where $$DEL = DEL' - DELCOR$$

wherein DELCOR=LAT×VFAC, sensing when the magnitude of the corrected error value DEL is in the range 0.05 to 0.5 and if it is then deciding which tire is deflated by calculating a deflation indicating factor IMC1–IMC4 for each wheel respectively wherein $$IMC1 = C1, \text{ then}$$

if the first deciding factor (MC1) is greater than the central deciding factor (MPSD) then $$IMC2 = C2/[((C4/C3)/2)+0.5]$$

$$IMC3 = C3/[((C4/C2)/2)+0.5]$$

$$IMC4 = C4/[[((C4/C3)/2)+0.5] \times [((C4/C2)/2)+0.5]];$$

if the second deciding factor (MC2) is greater than the central deciding factor (MPSD) then $$IMC2 = C2/[((C4/C3)/2)+0.5]$$

$$IMC3 = C3/[((C3/C1)/2)+0.5]$$

$$IMC4 = C4/[[((C4/C3)/2)+0.5] \times [((C3/C1)/2)+0.5]];$$

if the third deciding factor (MC3) is greater than the central deciding factor (MPSD) then $$IMC2 = C2/[((C2/C1)/2)+0.5]$$

$$IMC3 = C3/[((C4/C2)/2)+0.5]$$

$$IMC4 = C4/[[((C2/C1)/2)+0.5] \times [((C4/C2)/2)+0.5]];$$

if the fourth deciding factor (MC4) is greater than the central deciding factor (MPSD) then $$IMC2 = C2/[((C2/C1)/2)+0.5]$$

$$IMC3 = C3/[((C3/C1)/2)+0.5]$$

$$IMC4 = C4/[[((C2/C1)/2)+0.5] \times [((C3/C1)/2)+0.5]];$$

or if none of the deciding factors (MC1, MC2, MC3, MC4) is greater than the central deciding (MPSD) factor then $$IMC2 = C2/[(((C2+C4)/(C1+C3))/2)+0.5]$$

$$IMC3 = CS/[(((C3+C4)/(C1+C2))/2)+0.5]$$

$$IMC4 = C4/[[(((C3+C4)/(C1+C2))/2)+0.5] \times [(((C2+C4)/(C1+C3))/2)+0.5]],$$

and finally calculating a standardized corrected error value STDDEL by dividing the corrected error value DEL by the wheel factor FAC(W) for the wheel having the numerically greatest deflation indicating factor IMC1–IMC4 and when the value of the standardized corrected error value STDDEL is in the range 0.05 to 0.5 operating a tire warning indicator provided in the vehicle to indicate that the particular tire on the wheel having numerically the greatest deflation indicating factor IMC1–IMC4 is deflated.

Preferably the wheel factors FAC(W) for each wheel are calculated by dividing the error value DEL'FAC(W) of each wheel by the error value DEL'FAC(1) of the left-hand front wheel of the vehicle. Also preferably the wheel factors are derived from wheel speed values measured by driving the vehicle at 120 kph.

The value of KPHFAC may be calculated using a unit of speed of 1 kph.

Preferably the tire warning indicator is operated when the magnitude of the corrected error value is in the range 0.05 to 0.2.

The relationship of SETUPDEL and SETUPACCLAT may be determined by plotting values of SETUPDEL against values of SETUPACCLAT, fitting the best straight line through the graphical points and the origin at 0,0 in which case the value of VFAC is set equal to the slope of the straight line. The best straight line through the graphical point may be determined by any suitable method such as for example the Method of Least Squares.

Alternatively the relationship between SETUPDEL and SETUPACCLAT may be determined by direct mathematical means such as a linear regression calculation in which case the value of VFAC is set equal to the coefficient of the linear term in SETUPACCLAT. Preferably values of SETUPDEL and SETUPACCLAT are calculated from sets of values of wheel speeds C1–C4 measured at constant speeds in a circle commencing at 20 kph and increasing in increments of 5 kph.

The centralizing constant used in the derivation of the central deciding factor MPSD may be in the range of 0.250125 to 0.250625 and preferably has a value of 0.25025.

While the invention in fact compares the angular velocities of the wheels it should be understood that this can be done by comparing the times for one full turn of each wheel or by comparing digital signals for multipulse wheel speed generators.

To allow for tires from different manufacturers which may therefore be of different sizes an initialization procedure may be carried out. This monitors the signals under normal driving conditions and enables constants for each wheel to be determined to allow for variations.

BRIEF DESCRIPTION OF THE DRAWINGS

Further aspects of the present invention will become apparent from the following claims and description, by way of example only, of one embodiment in conjunction with the attached diagrammatic drawings in which:

DETAILED DESCRIPTION OF THE INVENTION

Figure 1:
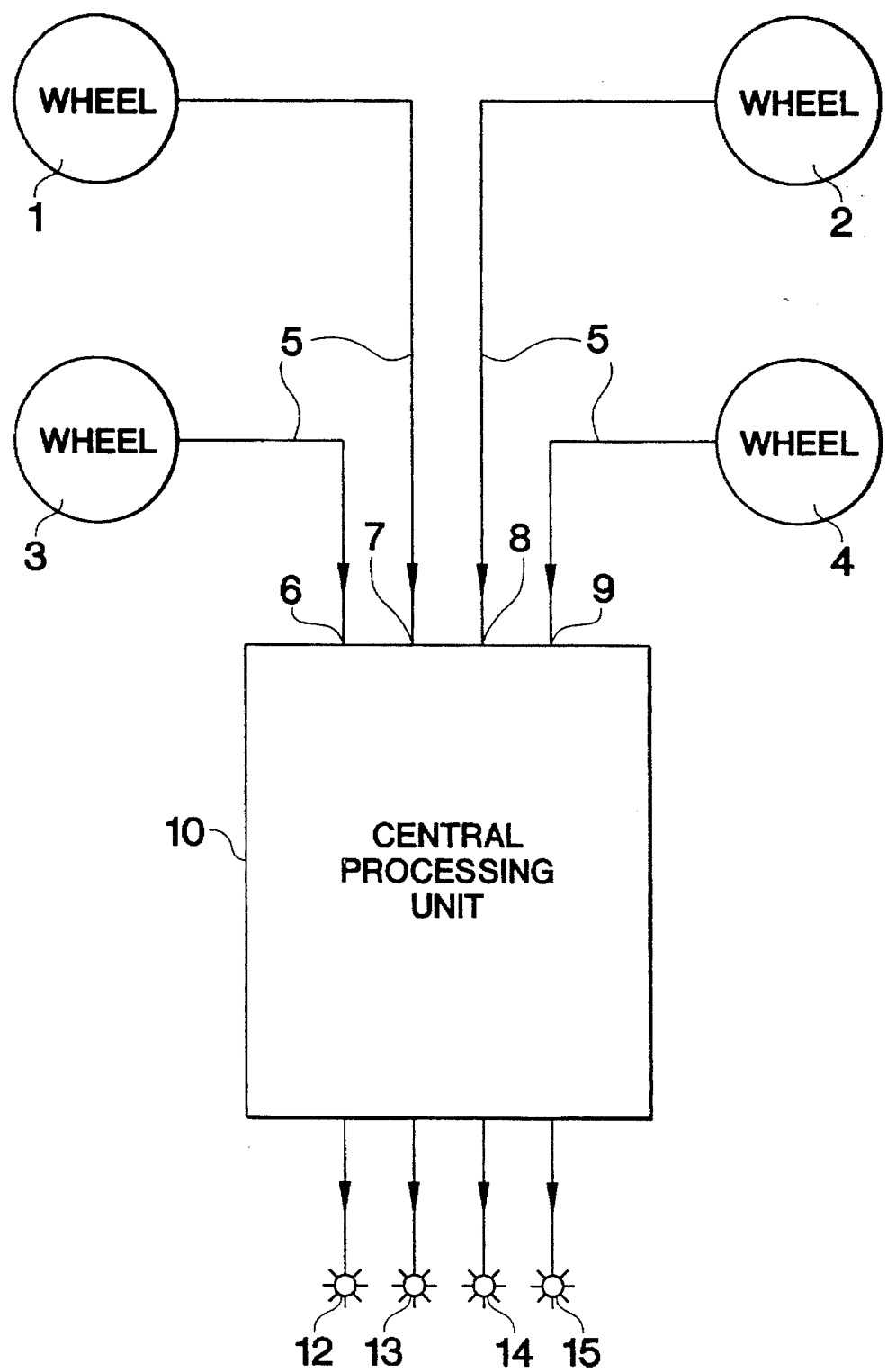
FIG. 1 is a schematic diagram showing a deflation warning device for a car having four wheels.

The apparatus shown in FIG. 1 provides a deflation warning device for a vehicle having four wheels 1, 2, 3 and 4. Wheels 1 and 2 are the left- and right-hand front wheels respectively and wheels 3 and 4 are the left- and right-hand rear wheels respectively. Each wheel has a toothed wheel device associated with it of the type designed and fitted to provide a digital signal comprising a magnetic pick-up of the type used for a vehicle anti-skid system of the electronic type—often commonly known as ABS braking system. Each pick-up is additionally connected in this case to a deflation warning detection system which uses the same digital signal as the ABS system.

The electronic signals from each of the four wheels are carried through cables 5 to four separate inputs 6, 7, 8 and 9 of a central processing unit 10. Four separate indicator lights 12, 13, 14 and 15 are provided one for each wheel 1, 2, 3 and 4. These indicator lights may be most conveniently mounted on the vehicle dashboard.

The central processing unit 10 is basically a microprocessor which monitors the four signals and compares them to determine if an outward signal is to be sent to operate an indicator light to warn of a deflated tire. In the case where the vehicle already has an ABS system fitted then the microprocessor 10 may be the same microprocessor as the ABS system. Alternatively, a separate microprocessor may be provided.

The respective values of the total digital pulse signals from each of the wheels 1, 2, 3 and 4 in a five second period are C1, C2, C3 and C4, respectively. The central processing unit 10 computes these frequency values as will be described below to determine whether or not to send a deflation warning signal to one of the warning lights 12, 13, 14 or 15.

Figure 2:
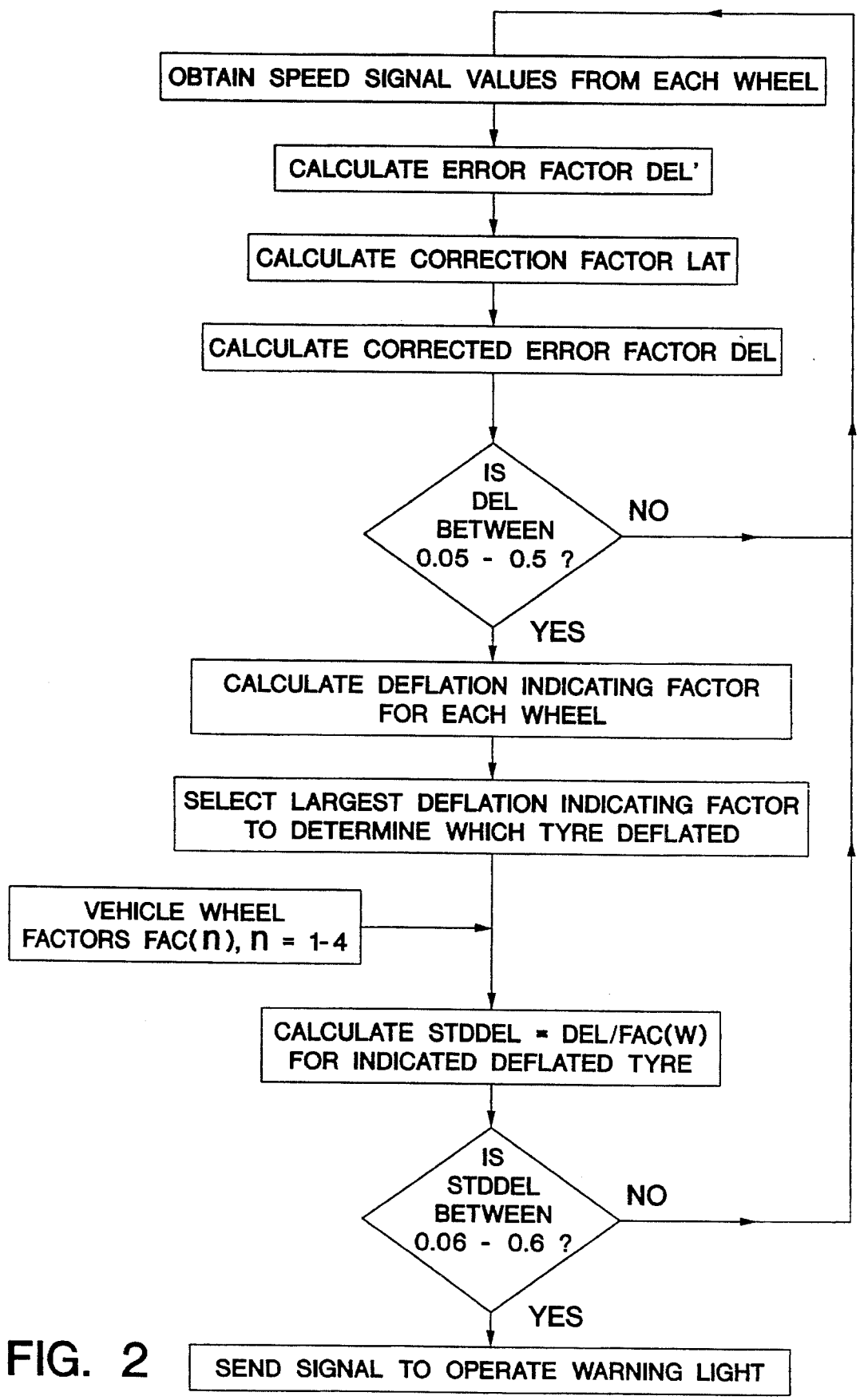
FIG. 2 is a schematic diagram showing the sequence of computations used to determine if a deflated tire exists and decide which one is deflated.
Figure 3:
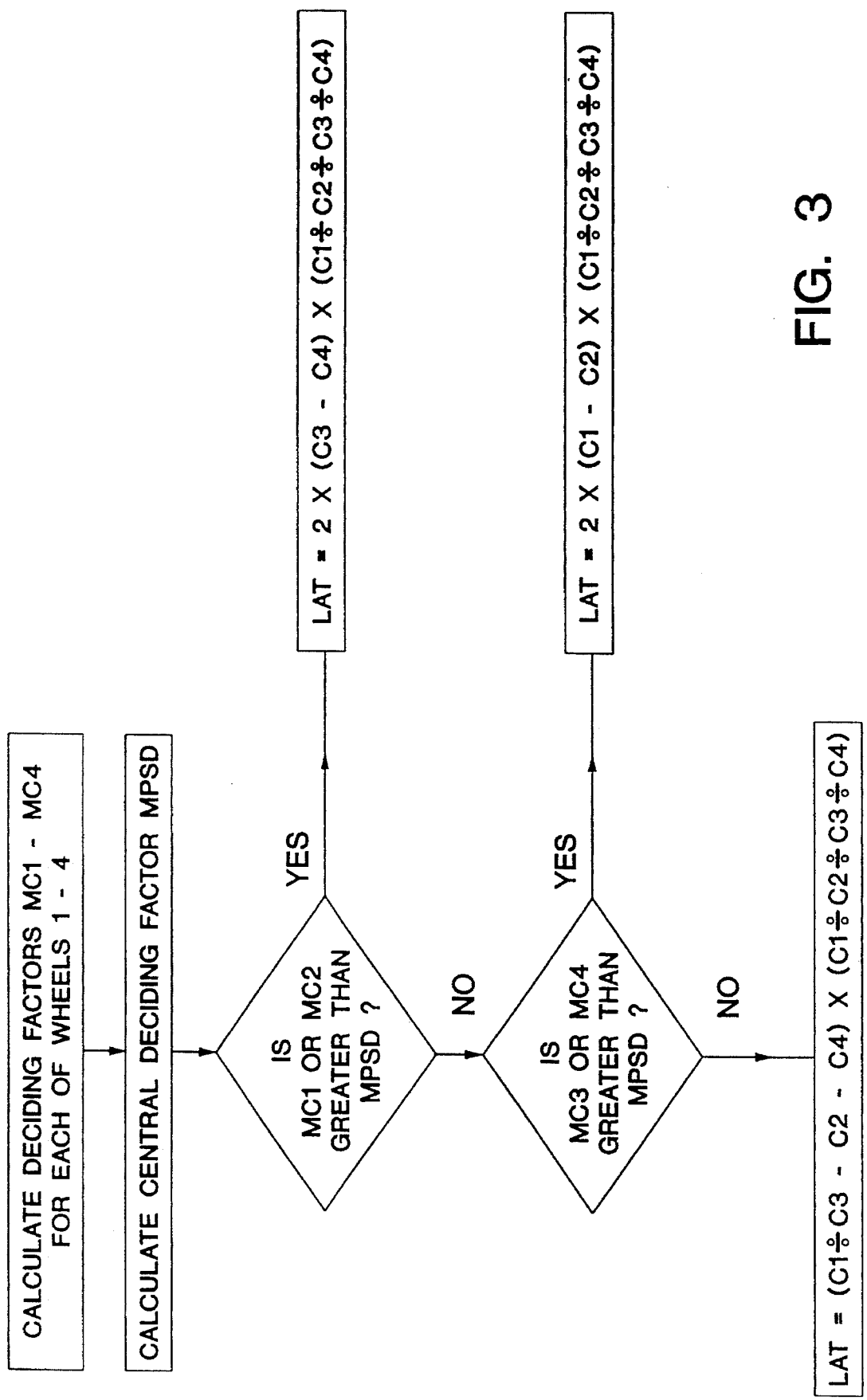
FIG. 3 is a schematic diagram showing the sequence of computations used in determining the correction factor LAT.

The sequence of operations used in this computation is shown schematically in FIG. 2.

The first operation in the method of the invention is to determine a vehicle related constant VFAC by a setup procedure wherein the vehicle is steered around a circle with its four tires inflated to their normal scheduled pressure at various constant speeds starting at 20 kph and increasing in increments of 5 kph to provide n sets of values $SV1$–$SVn$ of angular velocity speed signals C1–C4 at speeds of $20+(5 \times n-1)$ kph $n=1,2,3$, etc. Then calculating for each set of values $SVn$ of C1–C4 the setup lateral acceleration value $SETUPACCLATn$ wherein $$SETUPACCLAT=(C1+C3-C2-C4) \times (C1+C2+C3+C4)/(4 \times KPHFAC \times KPHFAC)$$

where KPHFAC is the number of wheel speed signals per wheel speed sensor per 1 kph, and calculating for each set of values $SVn$ of C1–C4 the vehicle setup error value $SETUPDELn$ where $$SETUPDEL=(C1+C4-C2-C3) \times 50/((C1+C2+C3+C4)/4)$$

Figure 4:
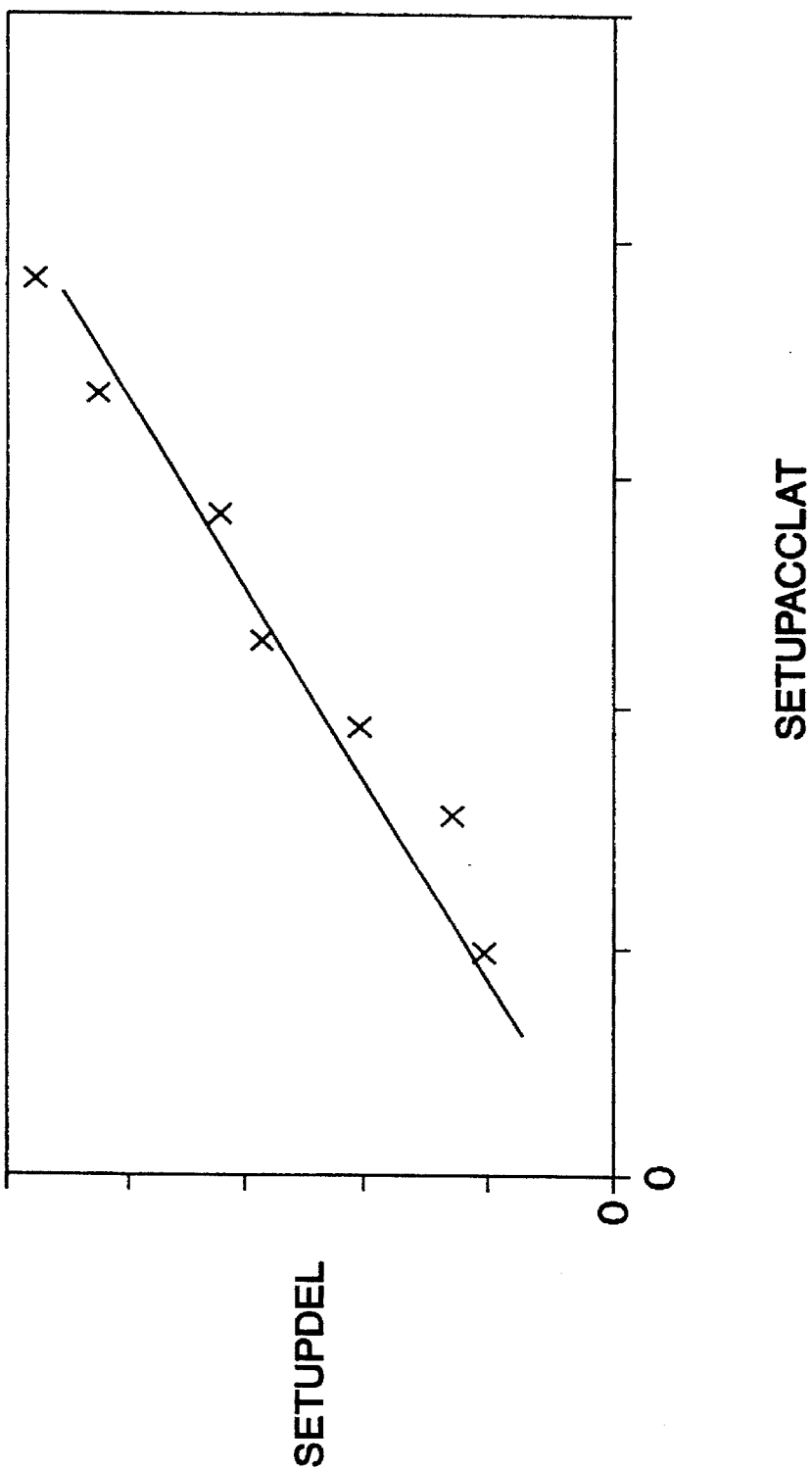
FIG. 4 shows the graphical determination of the vehicle related constant VFAC.

Values of vehicle setup error value SETUPDEL are then plotted graphically against setup lateral acceleration value SETUPACCLAT for each set of results $SVn$ as shown in FIG. 4. The value of the vehicle related constant VFAC is then set to be equal to the slope of the best straight line drawn through the graphical points according to a suitable method.

Suitable techniques for fitting the best straight line through graphical data points include for example the Method of Least Squares which is fully explained in, for example, "Statistics for Technologists", Chapter X, Paradine & Rivett, first published 1953 by English University Press Limited, London.

Alternatively the value of VFAC may be determined directly by a mathematical linear regression calculation.

The next step is to determine for each wheel of the vehicle a wheel factor FAC(W) W=1,2,3,4. This is done by driving the vehicle in a straight line at a constant speed of for example 120 kph and reducing in turn the pressure in each tire by 0.6 bar while maintaining the other tires at their scheduled pressure, and calculating a wheel error value DEL'FAC(W) for each wheel W produced by deflating the tire where $$DEL'FAC=(C1+C4-C2-C3)\times 50/((C1+C2+C3+C4)/4)$$

The wheel factor FAC(W) for each wheel W is then calculated by dividing the wheel error value DEL'FAC(W) for the wheel by the wheel error value of one of the wheels for example the left-hand front wheel 1, i.e.

$$FAC(W)=DEL'FAC(W)/DEL'FAC(1)$$

so that the wheel factors FAC(W) relate the error values of the wheels to each other.

Having once determined the value of the vehicle related constant VFAC and the wheel factor FAC(W) for each wheel W the method of deflation detection continues in normal driving by continuously monitoring the wheel speeds and calculating from the actual wheel speed values C1–C4 an error value DEL''where $$DEL' = \frac{[(C1 + C4)/2 - (C2 + C3)/2]}{(C1 + C2 + C3 + C4)/4} \times 100$$

However because the actual wheel speed values may be distorted due to vehicle factors such as cornering, braking, accelerating or uneven loads which give rise to a greater effect than that caused by a tire deflation it is necessary to correct this calculated error value to remove these vehicle effects.

To correct the error value DEL' a correction factor LAT is calculated according to the magnitude of respective deciding factors MC1–MC4 for each wheel in comparison to a central deciding factor MPSD. The central deciding factor is equal to the sum for the four deciding factors MC1–MC2 multiplied by a centralizing constant K which in this embodiment is selected to be 0.25025. The value of the correction factor LAT is then calculated depending on which if any of the four deciding factors MC1–MC4 is greater in magnitude than the central deciding factor MPSD as described below.

The correction factor LAT is selected by calculating from the four angular velocity values C1, C2, C3 and C4 respective first, second, third and fourth deciding factors (MC1, MC2, MC3, MC4) where $$MC1=C1$$

$$MC2=C2/[(C2+C4)/(C1+C3)]$$

$$MC3=C3/[(C3+C4)/(C1+C2)]$$

$$MC4=C4/[[(C2+C4)/(C1+C3)]\times[(C3+C4)/(C1+C2)]].$$

These four deciding factors are then summed and multiplied by a centralizing constant (K) to give a central deciding factor (MPSD). The correction factor (LAT) is then selected as follows, if the first or second deciding factor (MC1 or MC2) is greater than the central deciding factor (MPSD) then $$LAT=2\times(C3-C4)\times(C1+C2+C3+C4)/4,$$

if the third or fourth deciding factor (MC3 or MC4) is greater than the central deciding factor (MPSD) then $$LAT=2\times(C1-C2)\times(C1+C2+C3+C4)/4,$$

or if none of the deciding factors (MC1, MC2, MC3 or MC4) is greater than the central deciding factor (MPSD) then $$LAT=(C1+C3-C2-C4)\times(C1+C2+C3+C4)/4$$

A corrected error value DEL is then calculated by subtraction or an error correction factor DELCOR where $$DEL=DEL'-DELCOR$$

wherein the error correction factor equals the product of the correction factor and the vehicle related constant, i.e. DELCOR=LAT×VFAC.

Having calculated the corrected error value DEL the central processing unit 10 then decides if the value of DEL is in the range of 0.05 to 0.5 which indicates the presence of a deflated tire.

Values of DEL below 0.05 are the result of minor statistical variation in the counts from each wheel whereas values of DEL greater than 0.5 indicate a relatively uncommon occurrence such as wheel spin or a locked wheel and are greater than the effect of a punctured tire.

If the central processing unit 10 finds that the corrected error value is between 0.05 and 0.5 then the method of the invention moves on to the next stage which is to determine which tire is deflated. Otherwise the system continues to monitor wheel speeds.

To determine which tire is deflated the central processing unit 10 calculates for each wheel a deflation indicating factor IMC1–IMC4. These factors are calculated according to the following procedure:

$$IMC1=C1$$

if the first deciding factor (MC1) is greater than the central deciding factor (MPSD) then $$IMC2=C2/[((C4/C3)/2)+0.5]$$

$$IMC3=C3/[((C4/C2)/2)+0.5]$$

$$IMC4=C4/[[((C4/C3)/2)+0.5]\times[((C4/C2)/2)+0.5]];$$

if the second deciding factor (MC2) is greater than the central deciding factor (MPSD) then $$IMC2=C2/[((C4/C3)/2)+0.5]$$

$$IMC3=C3/[((C3/C1)/2 +0.5]$$

$$IMC4=C4/[[((C4/C3)/2)+0.5]\times[((C3/C1)/2+0.5)]];$$

if the third deciding factor (MC3) is greater than the central deciding factor (MPSD) then $$IMC2=C2/[((C2/C1)/2)+0.5]$$

$$IMC3=C3/[((C4/C2)/2)+0.5]$$

$$IMC4=C4/[[((C2/C1)/2)+0.5][((C4/C2)/2)+0.5]];$$

if the fourth deciding factor (MC4) is greater than the central deciding factor (MPSD) then $$IMC2=C2/[((C2/C1)/2)+0.5]$$

$$IMC3=C3/[((C3/C1)/2)+0.5]$$

$$IMC4=C4/[[((C2/C1)/2)+0.5]\times[((C3/C1)/2)+0.5]];$$

or if none of the deciding factors (MC1, MC2, MC3, MC4) is greater than the central deciding (MPSD) factor then $$IMC2=C2/[(((C2+C4)/(C1+C3))/2)+0.5]$$

$$IMC3=CS/[(((C3+C4)/(C1+C2))/2)+0.5]$$

$$IMC4=C4/[[(((C3+C4)/(C1+C2))/2)+0.5]\times[(((C2+C4)/C1+C3))/2)+0.5]].$$

Thus having obtained a deflation indicating factor for each of the four wheels the central processing unit compares these to determine which wheel has the factor of the largest magnitude.

Finally there is calculated a standardized corrected error value STDDEL by dividing the corrected error value DEL by the wheel factor FAC(W) for the wheel (W) having the numerically greatest deflation indicating factor IMC1–IMC4 and when the value of the standardized corrected error value STDDEL is in the range 0.05 to 0.5 a tire warning indicator provided in the vehicle is operated to indicate that the particular tire on the wheel having numerically the greatest deflation indicating factor IMC1–IMC4 is deflated.

In a preferred arrangement the tire warning indicator is only operated after three sets of deflation indicating factors, calculated from successive sets of wheel speed data, all indicate that a particular tire is deflated.

Whilst the above embodiment has illustrated the method of the invention using the signal data from a multi-toothed wheel system typically producing 48 or 96 pulses per wheel revolution the invention can equally be used with other wheel speed sensing systems. For example the method may be used with a simple system which uses a single pulse per revolution to compute the time period for one rotation of each wheel, in which case it will be necessary to multiply the wheel speeds by a constant factor to obtain data in the necessary form.

Having now described my invention what I claim is:

1. A method of detecting a deflated tire on a vehicle comprising the steps of:

providing one wheel speed sensor for each of the tires;

rotating each tire of the vehicle;

detecting the angular velocity speed of the tires by the wheel speed sensors;

comparing the rolling radii of the tires by means of comparing angular velocity speed signals C1, C2, C3 and C4 from wheel speed sensors on wheels 1–4 at the left-hand front, right-hand front, left-hand rear and right-hand rear wheel positions, respectively, characterized by:

performing a setup procedure comprising driving the vehicle in a straight line at a constant speed with the pressure in the tire of one wheel W reduced by 0.6 bar whilst the other tires are maintained at their scheduled pressure and monitoring the wheel speed values C1–C4; deriving a wheel error value DEL'FAC(W) for the wheel W by subtracting the sum of wheel speed values C1 and C4, multiplying the result by 50 and dividing this result by the mean of the four wheel speed values C1 to C4;

repeating the setup procedure to derive the wheel error values DEL'FAC(W) of all four wheels W,W=1,2,3,4;

deriving a wheel factor FAC(W), W=1,2,3,4 for each wheel by dividing each of the four wheel error values DEL'FAC(W) W=1,2,3,4 by the wheel error value of one of the wheels;

driving the vehicle normally and repeatedly determining an error value DEL' by monitoring and processing the four angular velocity speed signals C1 to C4 in a central processing unit (10) which subtracts the sum of the wheel speed values C2 and C3 of the diagonally opposite wheel 2 and 3 from the sum of wheel speed values C1 and C4 of the other pair of diagonally opposite wheels 1 and 4 and multiplies the result by 50 and divides the resultant by the mean of the four wheel speed values C1 and C4;

sensing when the magnitude of the error value DEL' is in the range of 0.05 to 0.5 and when it is comparing the angular velocity speed signals C1 to C4 of wheels 1 to 4 respectively with each other to determine which wheel has the apparently deflated tire, deriving a standardized corrected error value STDDEL by dividing the error value DEL' by the wheel factor FAC(W) of that wheel 1 to 4 which has the apparently deflated tire; and operating a tire warning indicator provided in the vehicle finally to indicate that a particular tire on the vehicle is deflated when the value of the standardized corrected error value of STDDEL is in the range 0.05 to 0.5.

2. The method of detecting a deflated tire on a vehicle according to claim 1 wherein the wheel factor FAC(W) for each of the wheels W is calculated by dividing the wheel error value DEL'FAC(W) by the wheel error value of wheel 1 DEL'FAC(1).

3. The method of detecting a deflated tire on a vehicle according to claim 1 wherein the wheel factors FAC(W) are determined by driving the vehicle in a straight line at a constant speed of 120 kph.

4. The method of detecting a deflated tire on a vehicle according to claim 1 comprising the step of calculating a corrected error value DEL by subtracting from the error value DEL' an error correction factor DELCOR and using the corrected error value DEL in place of error value DEL' to allow for vehicle characteristics.

5. The method of detecting a deflated tire on a vehicle according to claim 4 wherein the error correction factor DELCOR is proportional to a vehicle related correction factor LAT wherein the correction factor LAT is determined by deriving from the four angular velocity values C1, C2, C3, and C4 monitored during normal driving respective first, second, third and fourth deciding factors MC1, MC2, MC3 MC4 where equating the first deciding factor MC1 to the first wheel speed value C1;

determining the second deciding factor MC2 by dividing the second wheel speed value C2 by the quotient of the sum of wheel speed values C2 and C4 divided by the sum of values C1 and C3, determining the third deciding factor MC3 by dividing the third wheel speed value C3 by the quotient of the sum of the third and fourth values C3 and C4 divided by the sum of values C1 and C2, determining the fourth deciding factor MC4 by multiplying the quotient of the sum of values C2 and C4 divided by the sum of values C1 and C3 by the quotient of the sum of values C3 and C4 divided by the sum of values C1 and C2 and then dividing the fourth wheel speed value C4 by this result;

summing the first, second, third and fourth deciding factors MC1 to MC4 and multiplying this sum by a centralizing constant K having a value in the range 0.250125 to 0.250625 to give a central deciding factor MPSD; and determining the value of a correction factor LAT by comparing the values of the first, second, third and fourth deciding factors MC1, MC2, MC3 and MC4 with the value of the central deciding factor MPSD and in the even that either or both of the first and second deciding factors MC1 and MC2 are greater than the central deciding factor MPSD equating the value of the correction factor LAT with twice the product of the fourth wheel speed value C4 subtracted from the third wheel speed value C3 and multiplied by the mean of all four wheel speed values C1 to C4 or in the event that either or both of the third or fourth deciding factors MC3 and MC4 are greater than the central deciding factor equating the value of the correction factor LAT with twice the product of the second wheel speed value C2 subtracted from the first wheel speed value C1 multiplied by the mean of all four wheel speed values C1 to C4 or in the event that none of the deciding factors MC1 to MC4 are greater than the central deciding factor MPSD then equating the correction factor LAT with the value obtained by subtracting the sum of the second and fourth wheel speed values C2 and C4 from the sum of first and third wheel speed values C1 and C3 and multiplying the result by the mean of all four wheel speed values C1 to C4.

6. The method of detecting a deflated tire on a vehicle according to claim 5 wherein the error correction factor DELCOR is proportional to a vehicle related constant VFAC, wherein the vehicle related constant VFAC is determined by a setup procedure comprising steering the vehicle around a circle with its four tires inflated to their normal scheduled pressure at a plurality of n constant speeds, monitoring at each of the n constant speeds the values of the four angular velocity signal C1 to C4 to provide n sets of values SV1 to SVn of the four angular velocity values C1 to C4, deriving for each of the n sets of values SV1 to SVn of the four wheel speed values C1 to C4 a setup lateral acceleration value SETUPACCLAT by subtracting the sum of the wheel speed values C2 and C4 from the sum of wheel speed values C1 and C3 multiplying the result by the mean of all four wheel speed values C1 to C4 and dividing by the square of the number KPHFAC of wheel speed signals per wheel speed sensor per unit of speed, deriving for each of the n sets of values SV1 to SVn of the four wheel speed signal values C1 to C4 a vehicle setup error value SETUPDEL by subtracting the sum of the wheel speed values C2 and C3 from the sum of wheel speed values C1 and C4 multiplying the result by 50 and dividing by the mean of all four wheel speed values C1 to C4, determining a linear relationship between the values of setup lateral acceleration SETUPACCLAT and the corresponding setup error values SETUPDEL and setting the value of the vehicle related constant VFAC equal to the linear coefficient.

7. The method of detecting a deflated tire on a vehicle according to claim 6 wherein the first set of values SV1 of the four wheel speeds C1 to C4 measured at a constant speed of 20 kph and subsequent sets of values are measured at increments of 5 kph such that the nth set of values SVN is measured at $20+(5\times(n-1))$ kph.

8. The method of detecting a deflated tire on a vehicle according to claim 6 wherein the linear relationship between SETACCLAT and SETUPDEL is determined by plotting graphically the value of vehicle setup error value SETUPDEL against the setup lateral acceleration value SETUPACCLAT for each set of values SVn and setting the value of the vehicle related constant VFAC equal to the slope of the best straight line drawn through the plurality of n graphical points and the origin at (0.0) according to a suitable method.

9. The method of detecting a deflated tire on a vehicle according to claim 8 wherein the best straight line drawn through the graphical points of SETUPDEL plotted against SETUPACCLAT and the origin is drawn according to the Method of Least Squares.

10. The method of detecting a deflated tire on a vehicle according to claim 6 wherein the linear relationship between SETUPDEL and SETUPACCLAT is determined from the calculated values of SETUPDEL and SETUPACCLAT by performing a linear regression calculation of SETUPDEL on SETUPACCLAT and the value of the vehicle related constant VFAC is set equal to the coefficient of the linear term in SETUPACCLAT.

11. The method of detecting a deflated tire according to claim 6 wherein the error correction factor DELCOR is equal to the product of the vehicle related correction factor LAT and the vehicle relate constant VFAC.

12. The method of detecting a deflated tire according to claim 5 wherein the centralizing constant K has a value of 0.25025.

13. The method of detecting a deflated tire according to claim 1 wherein the tire warning indicator is operated when it is sensed that the magnitude of the standardized correction error value STDDEL is in the range 0.05 to 0.2.

14. The method of detecting a deflated tire on a vehicle according to claim 6 wherein KPHFAC is calculated using a unit of speed of 1 kph.

15. The method of detecting a deflated tire on a vehicle according to claim 1 wherein the step of deciding which tire is deflated is performed by:

deriving for each wheel 1 to 4 a deflation indicating factor IMC1, IMC2, IMC3, IMC4 respectively, by setting the deflation indicating factor IMC1 for wheel 1 equal to the wheel speed value C1 of wheel 1;

comparing the value of the first deciding factor MC1 with the value of the central deciding factor MPSD and in the event that the deciding factor MC1 is greater then setting the value of the deflation indicating factor IMC2 of wheel 2 equal to the wheel speed value C2 of wheel 2 divided by half of the quotient of the wheel speed value C4 of wheel 4 divided by the wheel speed value C2 of wheel 2 plus 0.5, setting the value of the deflation indicting factor IMC3 of wheel 3 equal to the wheel speed value C3 of wheel 3 divided by half of the quotient of the wheel speed value C4 of wheel 4 divided by the wheel speed value C2 of wheel 2 plus 0.5, setting the value of the indicating factor IMC4 of wheel 4 equal to the wheel speed value C4 of wheel 4 divided by the product of half of quotient of the wheel speed value C4 of wheel 4 and the wheel speed value C3 of wheel 3 plus 0.5 and half of the quotient of the wheel speed value C4 of wheel 4 and the wheel speed C2 of wheel 2 plus 0.5;

comparing the value of the second deciding factor MC2 with the value of the central deciding factor MPSD and in the event that the deciding factor MC2 is greater then setting the value of the deflation indicating factor IMC2 of wheel 2 equal to the wheel speed value C2 of wheel 2 divided by half of the quotient of the wheel speed value C4 of wheel 4 divided by the wheel speed value C3 of wheel 3 plus 0.5, setting the value of the deflation indicating factor IMC3 of wheel 3 equal to the wheel speed value C3 of wheel 3 divided by half of the quotient of the wheel speed value C3 of wheel 3 divided by the wheel speed value C1 of wheel 1 plus 0.5, setting the value of the indicating factor IMC4 of wheel 4 equal to the wheel speed value C4 of wheel 4 divided by the product of half of quotient of the wheel speed value C4 of wheel 4 and the wheel speed value C3 of wheel 3 plus 0.5 and half of the quotient of the wheel speed value C3 of wheel 3 and the wheel speed C1 of wheel 1 plus 0.5;

comparing the value of the third factor MC3 with the value of the central deciding factor MPSD and in the event that the deciding factor MC3 is greater then setting the value of the deflation indicating factor IMC2 of wheel 2 equal to the wheel speed value C2 of wheel 2 divided by half of the quotient of the wheel speed value C2 of wheel 2 divided by the wheel speed value C1 of wheel 1 plus 0.5, setting the value of the deflation indicating factor IMC3 of wheel 3 equal to the wheel speed value C3 of wheel 3 divided by half of the quotient of the wheel speed value C4 of wheel 4 divided by the wheel speed value C2 of wheel 2 plus 0.5, setting the value of the indicating factor IMC4 of wheel 4 equal to the wheel speed value C4 of wheel 4 divided by the product of half of quotient of the wheel speed value C2 of wheel 2 and the wheel speed value C1 of wheel 1 plus 0.5 and half of the quotient of the wheel speed value C4 of wheel 4 and the wheel speed C2 of wheel 2 plus 0.5;

comparing the value of the fourth factor MC4 with the value of the central deciding factor MPSD and in the event that the deciding factor MC4 is greater then setting the value of the deflation indicating factor IMC2 of wheel 2 equal to the wheel speed value C2 of wheel 2 divided by half of the quotient of the wheel speed value C2 of wheel 2 divided by the wheel speed value C1 of wheel 1 plus 0.5, setting the value of the deflation indicating factor IMC3 of wheel 3 equal to the wheel speed value C3 of wheel 3 divided by half of the quotient of the wheel speed value C3 of wheel 3 divided by the wheel speed value C1 of wheel 1 plus 0.5, setting the value of the indicating factor IMC4 of wheel 4 equal to the wheel speed value C4 of wheel 4 divided by the product of half of quotient of the wheel speed value C2 of wheel 2 and the wheel speed value C1 of wheel 1 plus 0.5 and half of the quotient of the wheel speed value C3 of wheel 3 and the wheel speed C1 of wheel 1 plus 0.5;

comparing the values of the first, second, third and fourth deciding factors MC1, MC2, MC3 and MC4 respectively with the value of the central deciding factor MPSD and in the event that none of the deciding factors is greater then setting the value of the deflation indicating factor IMC2 of wheel 2 equal to the wheel speed value C2 of wheel 2 divided by half of the quotient of the sum of wheel speed values C2 and C4 divided by the sum of wheel speed values C1 and C3 plus 0.5, setting the value of the deflation indicating factor IMC3 of wheel 3 equal to the wheel speed value C3 of wheel 3 divided by half of the quotient of the sum of wheel speed values C3 and C4 divided by the sum of wheel speed values C1 and C2 plus 0.5, setting the value of the deflation indicating factor IMC4 of wheel 4 equal to the wheel speed value C4 of wheel 4 by the product of half of the quotient of the sum of wheel speed values C3 and C4 divided by the sum of wheel speed values C1 and C2 plus 0.5 and half of the quotient of the sum of wheel speed values C2 and C4 divided by the sum of wheel speed values C1 and C3 plus 0.5; and determining the wheel having the numerically greater deflation indicating factor, and producing a deflation warning signal for the said wheel.

16. A deflated tire detector comprising:

a plurality of speed sensors each provided for a corresponding tire of a plurality of tires on a vehicle, each of said speed sensors outputting an angular velocity of said corresponding tire;

means for comparing rolling radii of said tires including means for calculating an error value DEL' where $$DEL'=(C1+C4-C2-C3)\times 50/((C1+C2+C3+C4)/4);$$

where C1, C2, C3 and C4 are angular velocity output by said speed sensors for left-hand front, right-hand front, left-hand rear and right-hand rear tires of the vehicle, respectively, means for calibratingly determining a wheel factor FAC(W) W=1,2,3,4 by a setup procedure comprising driving the vehicle in a straight line at constant speed and reducing in turn the pressure in each tire by 0.6 bar while maintaining the other tires at their schedule pressure, means for calculating a wheel error value DEL'FAC(W) for each wheel W produced with the deflated tire by the method for DEL' in normal driving, where $$DEL'FAC=(C1+C4-C2-C3)\times 50/((C1+C2+C3+C4)/4), \text{ and}$$

means for determining the wheel factor FAC(W) for each wheel W by dividing the wheel error values DEL'FAC(W) for the wheels by the wheel error value DEL'FAC of one of the wheels, namely $$FAC(W)=DEL'FAC(W)/DEL'FAC(1), \text{ or}$$

$$FAC(W)=DEL'FAC(W)/DEL'FAC(2), \text{ or}$$

$$FAC(W)=DEL'FAC(W)/DEL'FAC(3), \text{ or}$$

$$FAC(W)=DEL'FAC(W)/DEL'FAC(4);$$

means for determining a standardized corrected error signal STDDEL by dividing the error value DEL' by the wheel factor FAC(W) for the wheel having the tire which is apparently deflated;

means for determining when a magnitude of said standardized corrected error signal STDDEL is in the range 0.05 to 0.5 and for outputting a warning signal in response thereto; and a warning indicator, receiving said warning signal and providing a warning in accordance therewith.

17. The deflated tire detector according to claim 16, wherein said warning indicator is a light in the vehicle.

18. The deflated tire detector according to claim 16, wherein said warning indicator comprises a plurality of warning indicators, corresponding to said plurality of speed sensors.

19. The deflated tire detector according to claim 16, wherein each of said speed sensors comprises a toothed wheel device.

20. The deflated tire detector according to claim 16, wherein said means for determining said correction factor LAT comprises:

means for calculating, from the four angular velocity values C1, C2, C3 and C4, respective first, second, third and fourth deciding factors MC1, MC2, MC3, MC4 where $$MC1=C1$$

$$MC2=C2/[(C2+C4)/(C1+C3)]$$

$$MC3=C3/[(C3+C4)/(C1+C2)]$$

$$MC4=C4/[[(C2+C4)/(C1+C3)]\times[(C3+C4)/(C1+C2)]];$$

means for summing the four deciding factors and outputting a sum;

means for multiplying said sum be a centralizing constant (K) to give a central deciding factor MPSD; and means for selecting the correction factor LAT as follows, if the first or second deciding factor MC1 or MC2 is greater than the central deciding factor MPSD then $$LAT=2\times(C3-C4)\times(C1+C2+C3+C4)/4,$$

if the third or fourth deciding factor MC3 or MC4 is greater than the central deciding factor MPSD then $$LAT=2\times(C1-C2)\times(C1+C2+C3+C4)/4,$$

or if none of the deciding factors MC1, MC2, MC3 or MC4 is greater than the central deciding factor MPSD then $$LAT=(C1+C3-C2-C4)\times(C1+C2+C3+C4)/4.$$

21. The deflated tire detector according to claim 20, wherein the centralizing constant K has a value in the range 0.250125 to 0.250625.

22. The deflated tire detector according to claim 20, wherein the centralizing constant K has a value in the range 0.250250.

23. The deflated tire detector according to claim 20, further comprising means for calculating a deflation indicating factor IMC1, IMC2, IMC3, IMC4 for each wheel respectively and means for selecting the wheel having the numerically greater deflation indicating factor as being deflated, where the deflation indicating factors are calculated as follows:

$$IMC1=C1, \text{ then}$$

if the first deciding factor MC1 is greater than the central deciding factor MPSD then $$IMC2=C2/[((C4/C3)/2)+0.5]$$

$$IMC3=C3/[((C4/C2)/2)+0.5]$$

$$IMC4=C4/[[((C4/C3)/2)+0.5]\times[((C4/C2)/2)+0.5]];$$

if the second deciding factor MC2 is greater than the central deciding factor MPSD then $$IMC2=C2/[((C4/C3)/2)+0.5]$$

$$MC3=C3/[((C3/C1)/2)+0.5]$$

$$IMC4=C4/[[((C4/C3)/2)+0.5]\times[((C3/C1)/2)+0.5]];$$

if the third deciding factor MC3 is greater than the central deciding factor MPSD then $$IMC2=C2/[((C2/C1)/2)+0.5]$$

$$IMC3=C3/[((C4/C2)/2)+0.5]$$

$$IMC4=C4/[[((C2/C1)/2)+0.5]\times[((C4/C2)/2)+0.5]];$$

if the fourth deciding factor MC4 is greater than the central deciding factor MPSD then $$IMC2=C2/[((C2/C1)/2)+0.5]$$

$$IMC3=C3/[((C3/C1)/2)+0.5]$$

$$IMC4=C4/[[((C2/C1)/2)+0.5]\times[((C3/C1)/2)+0.5]];$$

or if none of the deciding factors MC1, MC2, MC3, MC4 is greater than the central deciding MPSD factor then $$IMC2=C2/[(((C2+C4)/(C1+C3))/2)+0.5]$$

$$IMC3=C3/[(((C3+C4)/(C1+C2))/2)+0.5]$$

$$IMC4=C4/[[(((C3+C4)/(C1+C2))/2)+0.5]\times[(((C2+C4)/(C1+C3))/2)+0.5]].$$

24. A method of detecting a deflated tire on a vehicle by comparing the rolling radii of the tires by means of comparing angular velocity speed signals C1, C2, C3 and C4 from wheel speed sensors on wheels 1–4 at the left-hand front, right-hand front, left-hand rear and right-hand rear wheel positions respectively, comprising the steps of:

calculating an error value DEL' in normal driving by processing the four angular velocity speed signals C1–C4 in a central process unit (10) which subtracts the sum of the signals from one pair of diagonally opposite wheels from the sum of the signals from the other pair of diagonally opposite wheels and expressing the result as a percentage of the mean of the sums $$DEL'=(C1+C4-C2-C3)\times 50/((C1+C2+C3+C4)/4);$$

sensing when the magnitude of the error value DEL' is in the range 0.05 to 0.5 and when it is carrying out a step of deciding which tire is apparently deflated by comparison of the angular velocity speed signals C1–C4 with each other, a calibration step of determining for each wheel of the vehicle a wheel factor FAC(W) W=1,2,3,4 by a setup procedure comprising driving the vehicle in a straight line at constant speed and reducing in turn the pressure in each tire by 0.6 bar while maintaining the other tires at their scheduled pressure, calculating a wheel error value DEL'FAC(W) for each wheel W produced with the deflated tire by the method for DEL' in normal driving, where $$DEL'FAC=(C1+C4-C2-C3)\times 50/((C1+C2+C3+C4)/4)$$

and calculating the wheel factor FAC(W) for each wheel W by dividing the wheel error values DEL'FAC(W) for the wheels by the wheel error value DEL'FAC of one of the wheels, namely $$FAC(W)=DEL'FAC(W)/DEL'FAC(1), \text{ or}$$

$$FAC(W)=DEL'FAC(W)/DEL'FAC(2), \text{ or}$$

$$FAC(W)=DEL'FAC(W)/DEL'FAC(3), \text{ or}$$

$$FAC(W)=DEL'FAC(W)/DEL'FAC(4)$$

so that the four wheel factors are related to each other and in normal operation of the vehicle a step of calculating a standardized corrected error value STDDEL by dividing the error value DEL' by the wheel factor FAC(W) for the wheel having the tire which is apparently deflated and, if the value of the standardized corrected error value STDDEL is in the range 0.05 to 0.5, operating a tire warning indicator provided in the vehicle finally to indicate that that particular tire on the wheel on the vehicle is deflated.

25. The method of detecting a deflated tire on a vehicle according to claim 24 wherein that the wheel factor FAC(W) for each of the wheels W is calculated by dividing the wheel error value DEL'FAC(W) by the wheel error value of wheel 1 DEL'FAC(1).

26. The method of detecting a deflated tire on a vehicle according to claim 24 wherein the wheel factors FAC(W) are determined by driving the vehicle in a straight line at a constant speed of 120 kph.

27. The method of detecting a deflated tire on a vehicle according to claim 24 comprising the step of calculating a corrected error value DEL by subtracting from the error value DEL' an error correction factor DELCOR, namely $$DEL=DEL'-DELCOR$$

and using the corrected error value DEL in place of error value DEL' to allow for vehicle characteristics.

28. The method of detecting a deflated tire on a vehicle according to claim 27 wherein the error correction factor DELCOR is proportional to a vehicle related correction factor LAT wherein the correction factor LAT is determined by calculating from the four angular velocity values C1, C2, C3, and C4 respective first, second, third and fourth deciding factors MC1, MC2, MC3, MC4 where $$MC1=C1$$

$$MC2=C2/[(C2+C4)/(C1+C3)]$$

$$MC3=C3/[(C3+C4)/(C1+C2)]$$

$$MC4=C4/[[(C2+C4)/(C1+C3)]\times[(C3+C4)/(C1+C2)]],$$

then summing the four deciding factors and multiplying this sum by a centralizing constant (K) to give a central deciding factor (MPSD) and selecting the correction factor LAT as follows, if the first or second deciding factor MC1 or MC2 is greater than the central deciding factor MPSD then $$LAT=2\times(C3-C4)\times(C1+C2+C3+C4)/4,$$

if the third or fourth deciding factor MC3 or MC4 is greater than the central deciding factor MPSD then $$LAT=2\times(C1-C2)\times(C1+C2+C3+C4)/4,$$

or if none of the deciding factors MC1, MC2, MC3 or MC4 is greater than the central deciding factor MPSD then $$LAT=(C1+C3-C2-C4)\times(C1+C2+C3+C4)/4.$$

29. The method of detecting a deflated tire on a vehicle according to claim 28 wherein the error correction factor DELCOR is proportional to a vehicle related constant VFAC, wherein the vehicle related constant VFAC is determined by a setup procedure comprising steering the vehicle around a circle with its four tires inflated to their normal scheduled pressure at a plurality of n constant speeds, monitoring at each of the n constant speeds the values of the four angular velocity signal C1 to C4 to provide n sets of values SV1 to SVn of the four angular velocity values C1 to C4, calculating for each set of values SV1 to SVn of C1–C4 the setup lateral acceleration value SETUPACCLAT where $$SETUPACCLAT=(C1+C3-C2-C4)\times(C1+C2+C3+C4)/(4\times KPHFAC\times KPHFAC)$$

where KPHFAC is the number of wheel speed signals per wheel speed sensor per unit of speed, calculating for each set of values SVn of C1–C4 the vehicle setup error value SETUPDEL where $$SETUPDEL=(C1+C4-C2-C3)\times 50/((C1+C2+C3+C4)/4),$$

determining a linear relationship between the values of setup lateral acceleration SETUPACCLAT and the corresponding setup error values SETUPDEL, and setting the value of the vehicle related constant VFAC equal to a linear coefficient, wherein the linear relationship between SETUPDEL and SETUPACCLAT is determined from the calculated values of SETUPDEL and SETUPACCLAT by performing a linear regression calculation of SETUPDEL on SETUPACCLAT and the value of the vehicle related constant VFAC is set equal to a coefficient of a linear term in SETUPACCLAT.

30. The method of detecting a deflated tire on a vehicle according to claim 29 wherein the first set of values SV1 of the four wheel speeds C1 to C4 is measured at a constant speed of 20 kph and subsequent sets of values are measured at increments of 5 kph such that the nth set of values SVn is measured at $20+(5\times(n-1))$ kph.

31. The method of detecting a deflated tire according to claim 29 wherein the error correction factor DELCOR is equal to the product of the vehicle related correction factor LAT and the vehicle related constant VFAC.

32. The method of detecting a deflated tire according to claim 28 wherein the centralizing constant K has a value in the range 0.250125 to 0.250625.

33. The method of detecting a deflated tire according to claim 28 wherein the centralizing constant K has a value of 0.25025.

34. The method of detecting a deflated tire according to claim 24 wherein the tire warning indicator is operated when it is sensed that the magnitude of the standardized corrected error value STDDEL is in the range 0.05 to 0.2.

35. The method of detecting a deflated tire on a vehicle according to claim 29 wherein KPHFAC is calculated using a unit of speed of 1 kph.

36. The method of detecting a deflated tire on a vehicle according to claim 24 wherein the step of deciding which tire is deflated is performed by calculating a deflation indicating factor IMC1–IMC4 for each wheel 1–4 respectively wherein $$IMC1=C1, \text{ then}$$

if a first deciding factor MC1 is greater than a central deciding factor MPSD then $$IMC2=C2/[((C4/C3)/2)+0.5]$$

$$IMC3=C3/[((C4/C2)/2)+0.5]$$

$$IMC4=C4/[[((C4/C3)/2)+0.5]\times[((C4/C2)/2)+0.5]];$$

if a second deciding factor MC2 is greater than the central deciding factor MPSD then $$IMC2=C2/[((C4/C3)/2)+0.5]$$

$$IMC3=C3/[((C3/C1)/2)+0.5]$$

$$IMC4=C4/[[((C4/C3)/2)+0.5]\times[((C3/C1)/2)+0.5]];$$

if a third deciding factor MC3 is greater than the central deciding factor MPSD then $$IMC2=C2/[((C2/C1)/2)+0.5]$$

$$IMC3=C3/[((C4/C2)/2)+0.5]$$

$$IMC4=C4/[[((C2/C1)/2)+0.5]\times[((C4/C2)/2)+0.5]];$$

if a fourth deciding factor MC4 is greater than the central deciding factor MPSD then $$IMC2=C2/[((C2/C1)/2)+0.5]$$

$$IMC3=C3/[((C3/C1)/2)+0.5]$$

$$IMC4=C4/[[((C2/C1)/2)+0.5]\times[((C3/C1)/2)+0.5]];$$

or if none of the deciding factors MC1, MC2, MC3, MC4 is greater than the central deciding factor MPSD then $$IMC2=C2/[(((C2+C4)/(C1+C3))/2)+0.5]$$

$$IMC3=C3/[(((C3+C4)/(C1+C2))/2)+0.5]$$

$$IMC4=C4/[(((C3+C4)/(C1+C2))/2)+0.5]\times[(((C2+C4)/(C1+C3))/2)+0.5]],$$

and selecting the wheel having the numerically greatest deflation indicating factor IMC1–IMC4 as the wheel having the apparently deflated tire.

37. The method of detecting a deflated tire on a vehicle according to claim 28 wherein the error correction factor DELCOR is proportional to a vehicle related constant VFAC, wherein the vehicle related constant VFAC is determined by a setup procedure comprising steering the vehicle around a circle with its four tires inflated to their normal scheduled pressure at a plurality of n constant speeds, monitoring at each of the n constant speeds the values of the four angular velocity signal C1 to C4 to provide n sets of values SV1 to SVn of the four angular velocity values C1 to C4, calculating for each set of values SV1 to SVn of C1–C4 the setup lateral acceleration value SETUPACCLAT where $$SETUPACCLAT=(C1+C3-C2-C4)\times(C1+C2+C3+C4)/(4\times KPHFAC\times KPHFAC)$$

where KPHFAC is the number of wheel speed signals per wheel speed sensor per unit of speed, calculating for each set of values SVn of C1–C4 the vehicle setup error value SETUPDEL where $$SETUPDEL=(C1+C4-C2-C3)\times 50/((C1+C2+C3+C4)/4),$$

determining a linear relationship between the values of setup lateral acceleration SETUPACCLAT and the corresponding setup error values SETUPDEL, and setting the value of the vehicle related constant VFAC equal to a linear coefficient, wherein the linear relationship between SETACCLAT and SETUPDEL is determined by plotting graphically the values of vehicle setup error value SETUPDEL against setup lateral acceleration value SETUPACCLAT for each set of values SVn and setting the value of the vehicle related constant VFAC equal to the slope of the best straight line drawn through the plurality of n graphical points and the origin at (0,0) according to a suitable method.

38. The method of detecting a deflated tire on a vehicle according to claim 37 wherein the best straight line drawn through the graphical points of SETUPDEL plotted against SETUPACCLAT and the origin is drawn according to the Method of Least Squares.

* * * * *